Patented Jan. 6, 1942

2,269,396

UNITED STATES PATENT OFFICE 2,269,396

MATERIAL FOR DESTROYING VEGETATION

David W. Jayne, Jr., Old Greenwich, Conn., assignor to American Cyanamid Company, New York, N. Y., a corporation of Maine No Drawing. Application July 11, 1939, Serial No. 283,739

9 Claims. (Cl. 167—45)

The present invention relates to mixtures having wetting properties and useful as herbicides, insecticides, fungicides or vegetation killers.

In spraying aqueous solutions, suspensions or emulsions onto vegetation or the like for herbicidal, insecticidal or fungicidal purposes, as well as for killing vegetation, it is well known that many types of leaves have a sufficiently waxy, shiny or hairy surface to repel the liquid. As a result, an ineffective contact is made between the liquid and the vegetation, with consequent lack of efficient kill.

It has been proposed heretofore to add a wetting agent of one kind or another to such aqueous liquids to enhance its wetting or spreading properties on vegetation, but some of the difficulties heretofore encountered are that such so-called wetting agents are salted out when used with concentrated aqueous herbicidal liquids, are insoluble in the liquid with which it is to be used, are not stable therein or are otherwise ineffective for the purpose when used in that combination.

It is, therefore, the object of the present invention to incorporate with an aqueous herbicide, insecticide, fungicide, germicide or vegetation killer, a material having wetting properties which will effectively enable the liquid in which the herbicide exists in either concentrated or dilute form, to wet or spread on foliage or other vegetation so as to insure efficient contact therewith and yet not be subject to the above objections.

It has been discovered that the ammonium, alkali metal, alkaline earth metal salts or in fact any water soluble salt of the dialkyl (for example, diethyl, diamyl, dioctyl, etc.), diaryl (for example, dicresyl, dixylenyl, etc.) or dialkyl aryl (for example, dibenzyl, di-$\beta$-phenyl ethyl, etc.) dithiophosphoric acids are not only readily soluble but are completely stable in concentrated aqueous herbicides and that the addition of such compound thereto aids markedly in its ability to spread on or wet foliage which is ordinarily wetted with great difficulty or not at all.

This increased wetting properly appears to be effectively usable with all types of aqueous herbicides, whether solutions, dispersions or emulsions.

For instance, the wetting of such hairy leaves as red clover, vegetation of the waxy type such as cabbage and shiny leaves of the green brier and poison ivy type are wetted to a considerably greater extent by aqueous solutions containing the above wetting agent than one without it.

Any desired amount of any of the above-mentioned salts of the dithiophosphoric acids may be used, although from $\frac{1}{16}$ of 1% to 10% is the preferred range, depending upon the character of vegetation to which the solution is to be applied and the concentration of the latter.

For example, the addition of the equivalent of three pounds of the ammonium salt of either disecondary amyl or dimixed aryl (cresyl, xylenyl, etc.) dithiophosphoric acid to fifty gallons of an aqueous solution containing about 25% of calcium thiocyanate and 10% of sodium chloride gave a concentrated product which, when diluted with as much as three parts of water to one part of the concentrated solution readily wet or spread completely on red clover leaves. A corresponding solution containing no disubstituted dithiophosphoric acid would not wet the same type of vegetation.

Water soluble salts of disubstituted dithiophosphoric acids can be used as spreaders or wetting agents in aqueous solutions, suspensions, emulsions or mixtures of any herbicide, insecticide, fungicide, germicide, vegetation killer or mixtures thereof, such for example, as solutions, suspensions or emulsions of sodium chlorate, sodium arsenite, nicotine, lime sulfur, copper arsenate, lead arsenate, Bordeaux mixture, ammonium thiocyanate, salt and practically all of the usual type of material for spraying upon vegetation.

Water soluble salts of some disubstituted dithiophosphoric acid, such as that of the dioctyl acid, are emulsification agents for this purpose and may be used as a combination emulsifier and spreader in herbicidal, insecticidal or fungicidal oil-in-water emulsions.

Some disubstituted dithiophosphoric acids possess herbicidal, insecticidal or fungicidal properties of their own, and water soluble salts of such acids, when used as spreaders in aqueous solutions, suspensions, emulsions or mixtures, will, besides aiding in spreading, increase the potency or utility of such products.

The invention is intended to cover herbicides, insecticides, fungicides and vegetation killers, in the form of aqueous solutions, suspensions, emulsions or mixtures.

While the invention has been described with specific reference to particular embodiments, it is to be understood that it is not to be limited thereto but is to be construed broadly and restricted solely by the scope of the appended claims.

I claim:

1. A herbicide including an aqueous carrier, calcium thiocyanate in an effective amount and a water-soluble salt of a disubstituted dithiophosphoric acid, the substituent being chosen from the group consisting of alkyl, aryl and alkylaryl.

2. The composition of claim 1 and sodium chloride.

3. The composition of claim 1 in which the substituent is alkyl.

4. The composition of claim 1 in which the substituent is aryl.

5. The composition of claim 1 in which the substituent is alkylaryl.

6. The composition of claim 1 in which the substituent is amyl.

7. The composition of claim 1 in which the substituent is cresyl.

8. A liquid herbicide including an aqueous carrier and containing calcium thiocyanate, sodium chloride and ammonium disecondary amyl dithiophosphate.

9. A liquid herbicide including an aqueous carrier and containing calcium thiocyanate, sodium chloride and ammonium dimixed aryl dithiophosphate.

DAVID W. JAYNE, Jr.